United States Patent
Fahn et al.

(10) Patent No.: US 9,883,231 B2
(45) Date of Patent: Jan. 30, 2018

(54) CONTENT CONTROL USING AN AUXILIARY DEVICE

(71) Applicant: Samsung Electronics Co., Ltd., Suwon-si, Gyeonggi-do (KR)

(72) Inventors: Paul Fahn, Sunnyvale, CA (US); Martin Freeman, Palo Alto, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 148 days.

(21) Appl. No.: 14/191,943

(22) Filed: Feb. 27, 2014

(65) Prior Publication Data

US 2015/0063779 A1 Mar. 5, 2015

Related U.S. Application Data

(60) Provisional application No. 61/873,051, filed on Sep. 3, 2013.

(51) Int. Cl.
| | |
|---|---|
| *H04N 21/431* | (2011.01) |
| *H04N 21/41* | (2011.01) |
| *H04N 21/43* | (2011.01) |
| *H04N 21/488* | (2011.01) |

(52) U.S. Cl.
CPC ....... *H04N 21/431* (2013.01); *H04N 21/4122* (2013.01); *H04N 21/4307* (2013.01); *H04N 21/4884* (2013.01)

(58) Field of Classification Search
CPC ..... H04N 21/42204; H04N 2005/4425; H04N 21/431; H04N 21/4122; H04N 21/4307; H04N 21/4884
See application file for complete search history.

(56) References Cited

U.S. PATENT DOCUMENTS

| | | |
|---|---|---|
| 6,567,984 B1 | 5/2003 | Allport et al. |
| 6,809,830 B1 | 10/2004 | Lafky |
| 7,143,353 B2 | 11/2006 | Thomas |

(Continued)

FOREIGN PATENT DOCUMENTS

| | | |
|---|---|---|
| KR | 10-2011-0093844 A | 8/2011 |
| WO | 2009151635 A1 | 12/2009 |

OTHER PUBLICATIONS

Park, M. et al., "A perceptive remote-control 3D TV interface", The International Society for Optical Engineering, Apr. 13, 2007, pp. 1-2, SPIE Newsroom, United States.

(Continued)

*Primary Examiner* — Hung Dang
*Assistant Examiner* — Sunghyoun Park
(74) *Attorney, Agent, or Firm* — Sherman IP LLP; Kenneth L. Sherman; Hemavathy Perumal

(57) ABSTRACT

One embodiment provides a system comprising a menu navigation application module comprising a request unit for requesting menu metadata information associated with a piece of content, a menu interface unit for generating one or more menu interfaces based on the menu metadata information, and a menu navigation control unit for enabling user interaction with menu interfaces during playback of the piece of content. The menu interfaces and the piece of content are displayed on different devices. The menu interfaces are displayed without interrupting the playback of the piece of content.

20 Claims, 5 Drawing Sheets

(56) References Cited

U.S. PATENT DOCUMENTS

| | | |
|---|---|---|
| 7,181,010 B2 | 2/2007 | Russ |
| 7,309,287 B2 | 12/2007 | Miyamoto et al. |
| 7,634,263 B2 | 12/2009 | Louch et al. |
| 7,748,000 B2 | 6/2010 | Genty et al. |
| 7,949,680 B2 | 5/2011 | Yanagita et al. |
| 7,987,491 B2 | 7/2011 | Reisman et al. |
| 8,261,261 B2 | 9/2012 | Tseng |
| 8,285,199 B2 | 10/2012 | Hsu et al. |
| 8,331,772 B1 | 12/2012 | Zdepski |
| 8,370,518 B2 | 2/2013 | Chen et al. |
| 8,386,563 B2 | 2/2013 | Parks et al. |
| 8,421,808 B2 | 4/2013 | Ishii et al. |
| 8,516,528 B2 | 8/2013 | Sandoval et al. |
| 8,549,115 B2 | 10/2013 | Park et al. |
| 8,554,938 B2 | 10/2013 | Mittal |
| 8,589,986 B2 | 11/2013 | McCoy |
| 8,726,189 B2 | 5/2014 | Weber et al. |
| 8,787,280 B2 | 7/2014 | Patil |
| 8,875,212 B2 | 10/2014 | Rakib |
| 8,959,506 B2 | 2/2015 | Kinsella |
| 8,974,282 B2 | 3/2015 | Haltovsky et al. |
| 9,252,950 B2 | 2/2016 | Caspi |
| 2004/0078382 A1* | 4/2004 | Mercer ............... G11B 19/025 |
| 2004/0103429 A1* | 5/2004 | Carlucci ............... H04N 7/163 725/32 |
| 2005/0200611 A1* | 9/2005 | Goto .................... G06F 3/0488 345/173 |
| 2006/0174215 A1* | 8/2006 | Yan ........................ G06F 8/38 715/825 |
| 2007/0171201 A1 | 7/2007 | Pi |
| 2007/0201833 A1* | 8/2007 | Cherna .................... H04N 5/91 386/230 |
| 2009/0168090 A1 | 7/2009 | Nakano et al. |
| 2009/0183145 A1* | 7/2009 | Hu ........................ G06F 8/67 717/168 |
| 2009/0249429 A1* | 10/2009 | Sullivan ............. H04N 7/17318 725/133 |
| 2010/0023852 A1 | 1/2010 | Chou |
| 2010/0046009 A1 | 2/2010 | Pandit et al. |
| 2010/0060572 A1 | 3/2010 | Tsern et al. |
| 2010/0097650 A1 | 4/2010 | Seo |
| 2010/0169780 A1* | 7/2010 | Bryant-Rich ........ G11B 27/005 715/719 |
| 2010/0192206 A1 | 7/2010 | Aoyama |
| 2010/0197220 A1 | 8/2010 | Zilliacus |
| 2010/0262673 A1 | 10/2010 | Chang et al. |
| 2010/0277365 A1 | 11/2010 | Ha et al. |
| 2011/0083069 A1 | 4/2011 | Paul et al. |
| 2011/0099157 A1 | 4/2011 | Lebeau et al. |
| 2011/0214121 A1 | 9/2011 | Gentile et al. |
| 2012/0008910 A1 | 1/2012 | Tamura et al. |
| 2012/0033140 A1* | 2/2012 | Xu .................... H04N 21/42224 348/734 |
| 2012/0050183 A1 | 3/2012 | Lee et al. |
| 2012/0066715 A1 | 3/2012 | Jain et al. |
| 2012/0146918 A1* | 6/2012 | Kreiner ............... H04M 1/7253 345/173 |
| 2012/0151530 A1 | 6/2012 | Krieger |
| 2012/0198350 A1* | 8/2012 | Nhiayi .................. G06F 9/4445 715/740 |
| 2013/0094591 A1 | 4/2013 | Laksono |
| 2013/0108239 A1* | 5/2013 | Ryer ................ H04N 21/47205 386/241 |
| 2013/0132605 A1* | 5/2013 | Kocks .................. H04N 21/262 709/231 |
| 2014/0010121 A1 | 1/2014 | Patil et al. |
| 2014/0082610 A1 | 3/2014 | Wang |
| 2014/0089414 A1 | 3/2014 | Patil et al. |
| 2014/0099973 A1 | 4/2014 | Cecchini et al. |
| 2014/0165112 A1 | 6/2014 | Freeman et al. |
| 2014/0170978 A1 | 6/2014 | Wolman et al. |
| 2014/0215457 A1 | 7/2014 | Gava et al. |
| 2015/0067508 A1 | 3/2015 | Fahn et al. |

OTHER PUBLICATIONS

Bove Jr., V.M. et al., "Hyperlinked television research at the MIT Media Laboratory" IBM Systems Journal, Jul. 2000, pp. 470-478, vol. 39, Nos. 3&4, IBM, United States \.

U.S. Final Office Action for U.S. Appl. No. 13/751,821 dated Dec. 19, 2014.

U.S. Non-Final Office Action for U.S. Appl. No. 14/023,215 dated Jan. 16, 2015.

U.S. Advisory Action for U.S. Appl. No. 14/023,215 dated Oct. 22, 2015.

U.S. Non-Final Office Action for U.S. Appl. No. 14/190,026 dated Sep. 30, 2015.

U.S. Advisory Action for U.S. Appl. No. 13/751,821 dated Jan. 25, 2016.

European Search Report dated Mar. 14, 2014 for European Patent Application No. 14150416.7 from European Patent Office, pp. 1-8, Munich Germany.

Wikipedia, "Secure Shell-SSH", Jan. 26, 2013, pp. 1-9, Wikipedia. org, United States (downloaded on Jul. 30, 2014).

International Search Report and Written Opinion dated Mar. 31, 2014 for International Application No. PCT/KR2013/011498 from Korean Intellectual Property Office, pp. 1-8, Daejeon, Republic of Korea.

U.S. Non-Final Office Action for U.S. Appl. No. 13/751,821 dated May 21, 2014.

U.S. Final Office Action for U.S. Appl. No. 13/751,821 dated Nov. 4, 2015.

U.S. Final Office Action for U.S. Appl. No. 14/023,215 dated Aug. 3, 2015.

U.S. Non-Final Office Action for U.S. Appl. No. 13/751,821 dated Mar. 4, 2016.

U.S. Non-Final Office Action for U.S. Appl. No. 14/023,215 dated Apr. 6, 2016.

U.S. Final Office Action for U.S. Appl. No. 14/190,026 dated Feb. 10, 2016.

U.S. Final Office Action for U.S. Appl. No. 13/751,821 dated Sep. 6, 2016.

U.S. Final Office Action for U.S. Appl. No. 14/023,215 dated Sep. 23, 2016.

U,S. Advisory Action for U.S. Appl. No. 14/190,026 dated May 19, 2016.

U.S. Advisiory Action for U.S. Appl. No. 13/751,821 dated Dec. 20, 2016.

U.S. Advisory Action for U.S. Appl. No. 14/023,215 dated Jan. 12, 2017.

U.S. Non-Final Office Action for U.S. Appl. No. 13/751,821 dated Mar. 9, 2017.

U.S. Non Final Office Action for U.S. Appl. No. 14/023,215 dated Feb. 23, 2017.

U.S. Non-Final Office Action for U.S. Appl. No. 13/751,821 dated May 20, 2015.

U.S. Final Office Action for U.S. Appl. No. 13/751.821 dated Oct. 3, 2017 by Examiner Zhan Chen.

U.S. Final Office Action for U.S. Appl. No. 14/023,215 dated Aug. 30, 2017 by Examiner Robert J. Michaud.

U.S. Non-Final Office Action for U.S. Appl. No. 14/190,026 dated Sep. 12, 2017 by Examiner Mohamed Abou El Seoud.

U.S. Advisory Active for U.S. Appl. No. 14/023,215 dated Dec. 13, 2017 by Examiner Robert J. Michaud.

* cited by examiner

CONTENT CONTROL USING AN AUXILIARY DEVICE

CROSS-REFERENCE TO RELATED APPLICATIONS

This application claims priority to United States (U.S.) Provisional Patent Application Ser. No. 61/873,051, filed on Sep. 3, 2013, which is incorporated herein by reference.

TECHNICAL FIELD

One or more embodiments relate generally to content navigation, and in particular content control using an auxiliary device.

BACKGROUND

Conventionally, a user may navigate through content playing on a device by manually pressing buttons representing navigation commands on the device or a remote control for the device.

SUMMARY

One embodiment provides a system comprising a menu navigation application module comprising a request unit for requesting menu metadata information associated with a piece of content, a menu interface unit for generating one or more menu interfaces based on the menu metadata information, and a menu navigation control unit for enabling user interaction with menu interfaces during playback of the piece of content. The menu interfaces and the piece of content are displayed on different devices. The menu interfaces are displayed without interrupting the playback of the piece of content.

These and other aspects and advantages of one or more embodiments will become apparent from the following detailed description, which, when taken in conjunction with the drawings, illustrate by way of example the principles of one or more embodiments.

BRIEF DESCRIPTION OF THE DRAWINGS

For a fuller understanding of the nature and advantages of one or more embodiments, as well as a preferred mode of use, reference should be made to the following detailed description read in conjunction with the accompanying drawings, in which.

DETAILED DESCRIPTION

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

Figure 1:
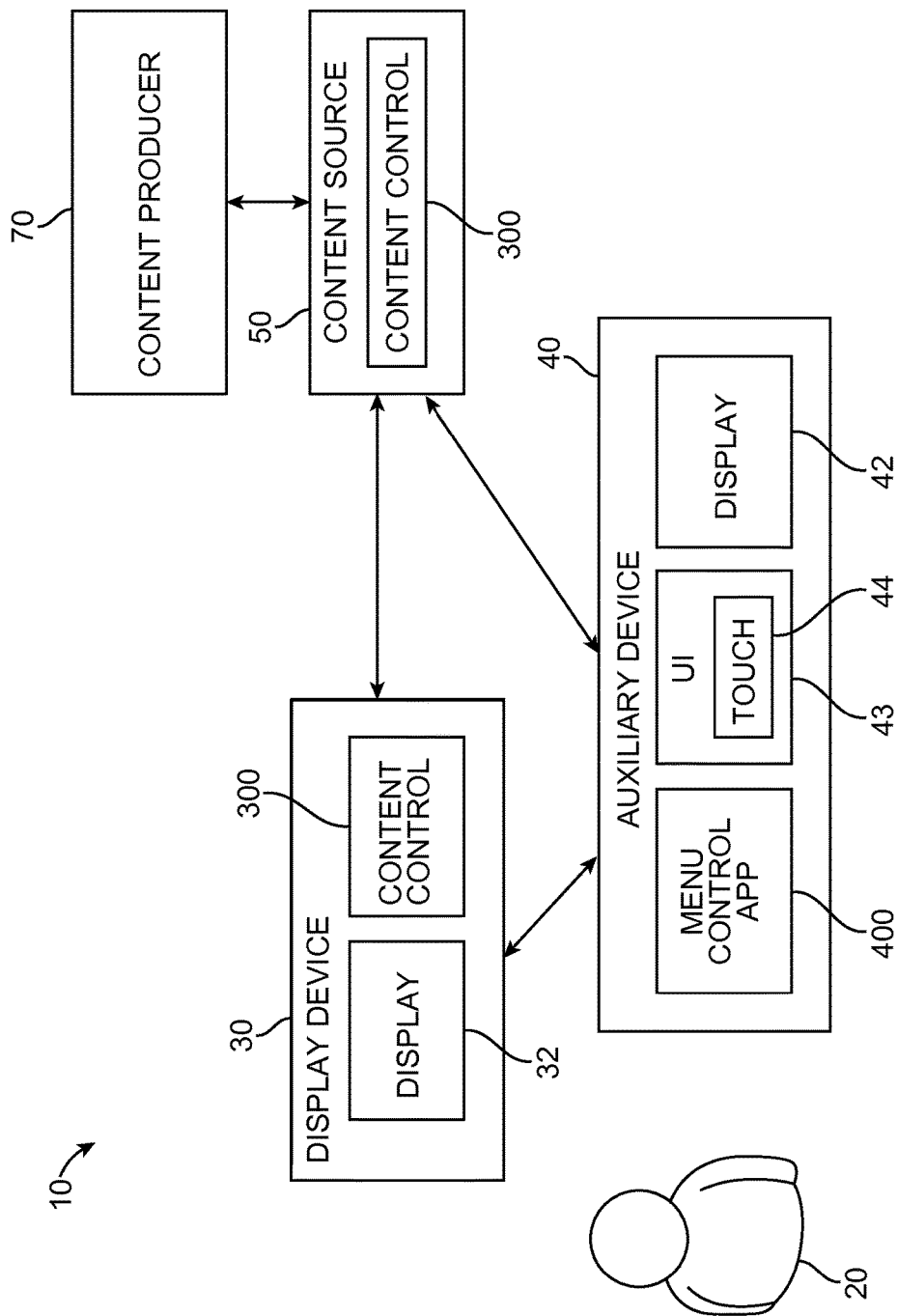
FIG. 1 illustrates a block diagram of a content control system, in accordance with an embodiment of the invention.

FIG. 1 illustrates a block diagram of a content control system 10, in accordance with an embodiment of the invention. The system 10 comprises an electronic display device 30. The display device 30 may be an appliance, a personal computer (PC), a television (TV) (e.g., a smart TV), or a mobile device (e.g., a laptop computer, a mobile phone such as a smart phone, etc.).

A user 20 may utilize the display device 30 for content playback. The display device 30 comprises a content control application module ("content control unit") 300 that enables and controls playback of content (e.g., audio content, video content, images, photos, documents, and/or audiovisual content such as movies, television shows, episodes of television programs, etc.), and a primary display unit 32 for displaying the content and/or visuals associated with the content. As described in detail later herein, the content control unit 300 controls playback of content based on one or more user selections made by the user 20 via one or more menu interfaces.

Specifically, the system 10 further comprises an auxiliary device 40 that provides the user 20 with at least one authored menu interface ("authored menu") 200 (FIG. 4) associated with content displayed on the display device 30. In this specification, let the term authored menu denote a particular menu interface for a particular piece of content from a content producer 70 that is generated based on menu metadata information associated with the particular piece of content. The menu metadata information may originate from the content producer 70. An authored menu 200 comprises one or more selectable content navigation commands and/or content setting commands. An authored menu 200 may further comprise additional elements that affect the formatting and/or aesthetic "look and feel" of the menu interface, such as font types, font sizes, font colors, screen positioning information, background images, etc. In one embodiment, an authored menu 200 is provided as a web page using HTML or another markup language.

The display device 30 and the auxiliary device 40 communicate with each other over a connection (e.g., a wireless connection, a wired connection, or a combination of the two). In one embodiment, the display device 30 and the auxiliary device 40 belong to the same Local Area Network (LAN).

The auxiliary device 40 comprises a menu control application module ("menu control app") 400 for generating one or more authored menus 200 based on menu metadata information associated with the content displayed on the display device 30, and a secondary display unit 42 for displaying each authored menu 200 generated. The menu control app 400 is a software application configured to run on the auxiliary device 40. As described in detail later herein, the menu control app 400 requests menu metadata information associated with the content displayed on the display device 30 when the menu control app 400 discovers the content displayed on the display device 30.

The auxiliary device 40 further comprises a user interface unit 43 for enabling user interaction with an authored menu 200 displayed on the auxiliary device 40. In one embodiment, the user interface unit 43 comprises a touch user interface 44 that allows the user 20 to interact with an authored menu 200 and select one or more selectable content navigation commands and/or content setting commands using his or her finger. For example, the user 20 may interact with one or more authored menus 200 associated with the content to select content navigation commands, such as a particular audio track or video track of the content for playback. The user 20 may also interact with one or more authored menus 200 associated with the content to select content setting commands, such as audio and subtitle settings. The user interface unit 43 may also comprise one or more of the following: a keyboard, a keypad, a pointing device, etc.

The user 20 may interact with the authored menus 200 displayed on the auxiliary device 40 to select content navigation commands and/or content settings commands without interrupting the playback of content on the display device 30. Therefore, the user 20 can interact with authored menus 200 providing content navigation commands and/or content settings commands via the auxiliary device 40 without having to pause the content displayed on the display device 30.

As described in detail later herein, the menu control app 400 generates, based on user interaction with an authored menu 200 displayed on the auxiliary device 40, one or more action messages for controlling the playback of content displayed on the display device 30. Each action message includes one or more content navigation commands and/or content setting commands selected by the user 20 via an authored menu 200 displayed on the auxiliary device 40.

The system 10 further comprises a content source 50. The content source 50 provides content to the display device 30 for display. The content source 50 provides content to the display device 30 over a connection (e.g., a wireless connection, a wired connection, or a combination of the two). The content provided may originate from a—content producer 70, an optical disk or a memory unit of the content source 50. In one embodiment, the content source 50 is an Internet-based cloud service (e.g., Netflix, YouTube, Amazon, Hulu) that streams content to the display device 30 for display. In another embodiment, the content source 50 is a content playing device, such as a local/in-home electronic device (e.g., a set-top box connected with the display device 30, a local media player such as a DVD player or a Blu-Ray player).

In one embodiment, the menu control app 400 requests menu metadata information associated with the content displayed on the display device 30 from a content control unit 300 of the display device 30. Action messages generated by the menu control app 400 are sent to the content control unit 300 of the display device 30.

In another embodiment, the content source 50 comprises a content control unit 300 for controlling the playback of content displayed on the display device 30. The menu control app 400 requests menu metadata information associated with the content displayed on the display device 30 from a content control unit 300 of the content source 50. Action messages generated by the menu control app 400 are sent to the content control unit 300 of the content source 50.

In yet another embodiment, the menu control app 400 requests menu metadata information associated with the content displayed on the display device 30 from the display device 30. Action messages generated by the menu control app 400 are sent to the content control unit 300 of the content source 50.

In one embodiment, each content control unit 300 implements UPnP Content Control Service. The UPnP Content Control Service facilitates the conveyance of menu metadata information from a content control unit 300 to the menu control app 400, and user selections from the menu control app 400 to the content control unit 300.

In another embodiment, each content control unit 300 implements remote user interface (RUI) technology based on client-server architecture. RUI technology allows for a first device (e.g., the auxiliary device 40) to control a second device (e.g., the display device 30). Specifically, a RUI client operating on the first device may acquire a user interface from a RUI server operating on the second device such that a user of the RUI client may control the RUI server through the user interface on the RUI client.

Figure 2:
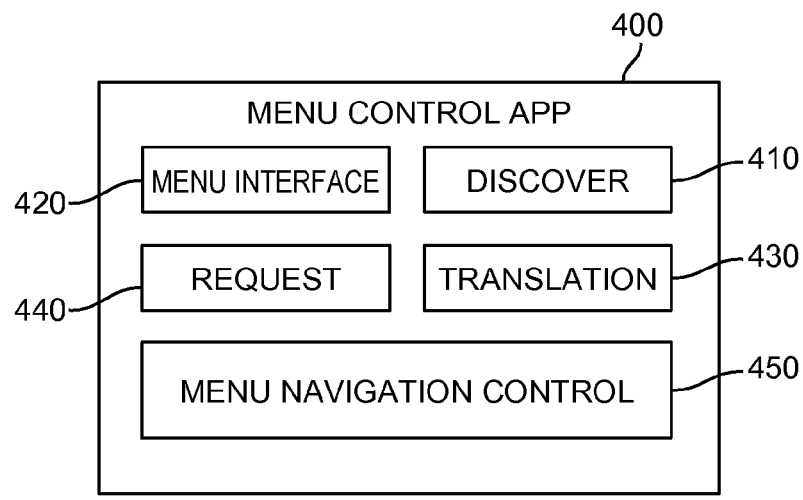
FIG. 2 is a block diagram of an example menu control app, in accordance with an embodiment of the invention.

FIG. 2 is a block diagram of an example menu control app 400, in accordance with an embodiment of the invention. The menu control app 400 resides on an auxiliary device 40. The menu control app 400 comprises a discover unit 410 configured to discover a content control unit 300 controlling playback of content on a display device 30 within proximity of the auxiliary device 40. In one embodiment, the content control unit 300 resides on the display device 30. In another embodiment, the content control unit 300 resides on a content source 50 providing the content to the display device 30.

The menu control app 400 further comprises a request unit 440, a menu interface unit 420, and a translation unit 430. When the discover unit 410 discovers content playing on the display device 30, the request unit 440 requests menu metadata information associated with the content from the content control unit 300. Based on menu metadata information received from the content control unit 300, the menu interface unit 420 generates one or more authored menus 200 for display on the auxiliary device 40.

In one embodiment, the authored menus 200 generated may be in a menu format that is incompatible with one or more device attributes of the auxiliary device 40. The translation unit 430 is configured to translate an authored menu 200 from one menu format to another menu format that is suitable for display on the auxiliary device 40.

In another embodiment, the translation unit 430 may reside where the menu control app 400 requests menu metadata information from, such as the display device 30 or the content source 50. Instead of having to generate authored menus 200, the menu control app 400 instead receives authored menus 200, from the display device 30 or the content source 50, in a menu format that is suitable for display on the auxiliary device 40.

The menu control app 400 further comprises a menu navigation control unit 450. The menu navigation control unit 450 enables user navigation of one or more authored menus 200 displayed on the auxiliary device 40, thereby facilitating user selection of one or more content navigation commands and/or content settings commands. When a content navigation command and/or a content setting command is selected, the menu navigation control unit 450 generates an action message including the selected content navigation command and/or content setting command selected by the user 20, and sends the action message to the content control unit 300.

Figure 3:
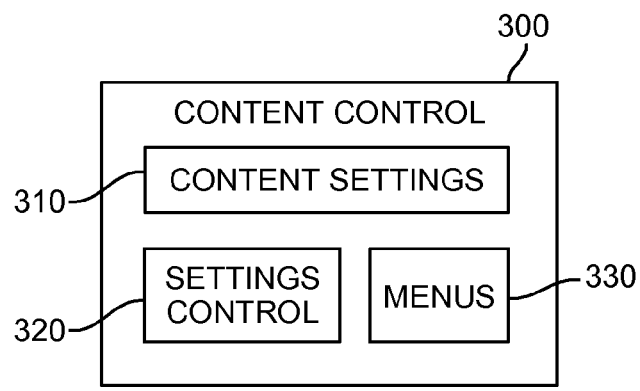
FIG. 3 is a block diagram of an example content control unit, in accordance with an embodiment of the invention.

FIG. 3 is a block diagram of an example content control unit 300, in accordance with an embodiment of the invention. The content control unit 300 controls playback of content on a display device 30 based on one or more action messages received from an auxiliary device 40 within proximity of the display device 30. In one embodiment, the content control unit 300 resides on the display device 30. In another embodiment, the content control unit 300 resides on a content source 50 providing the content to the display device 30.

The content control unit 300 comprises a memory unit 310 maintaining content settings information for the content displayed on the display device 30. In one embodiment, the content settings information includes one or more content playback parameters, such as a parameter identifying whether subtitles are on or off, a parameter identifying a selected subtitle track number, etc.

The content control unit 300 further comprises another memory unit 330 maintaining menu metadata information associated with the content displayed on the display device 30. The content control unit 300 provides the menu metadata information to the auxiliary device 40 when the content control unit 300 receives a request for menu metadata information from the auxiliary device 40.

The content control unit 300 further comprises a content settings control unit 320 for receiving action messages from the auxiliary device 40, and controlling the playback of the content on the display device 30 based on the action messages received. The content settings control unit 320 adjusts the content settings information maintained in the memory unit 310 based on selected content navigation commands and/or content setting commands including in the action messages received. For example, if a user 20 selects a particular audio track or video track for playback via the auxiliary device 40, the content control unit 320 adjusts the playback of the content on the display device 30 by jumping from a current audio track or video track to the selected audio track or video track.

Figure 4:
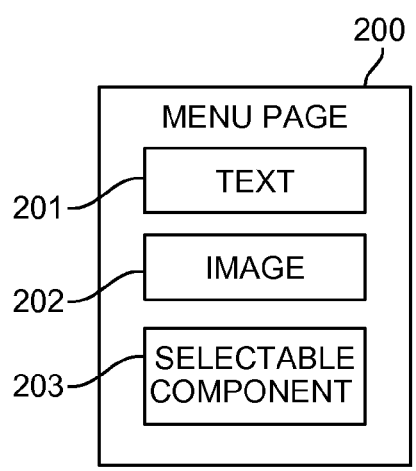
FIG. 4 illustrates an example authored menu, in accordance with an embodiment of the invention.

FIG. 4 illustrates an example authored menu 200, in accordance with an embodiment of the invention. In one embodiment, an authored menu 200 received/generated by the menu interface unit 420 is a hyperlink-style menu interface. For example, the authored menu 200 may be a web page created using HTML. The authored menu 200 includes one or more texts areas 201, one or more image areas 202, and one or more selectable GUI components (e.g., links or buttons) 203. Each selectable GUI component 203 provides a user 20 with the option of viewing another authored menu 200 or selecting a particular content navigation command and/or content setting command.

Figure 5:
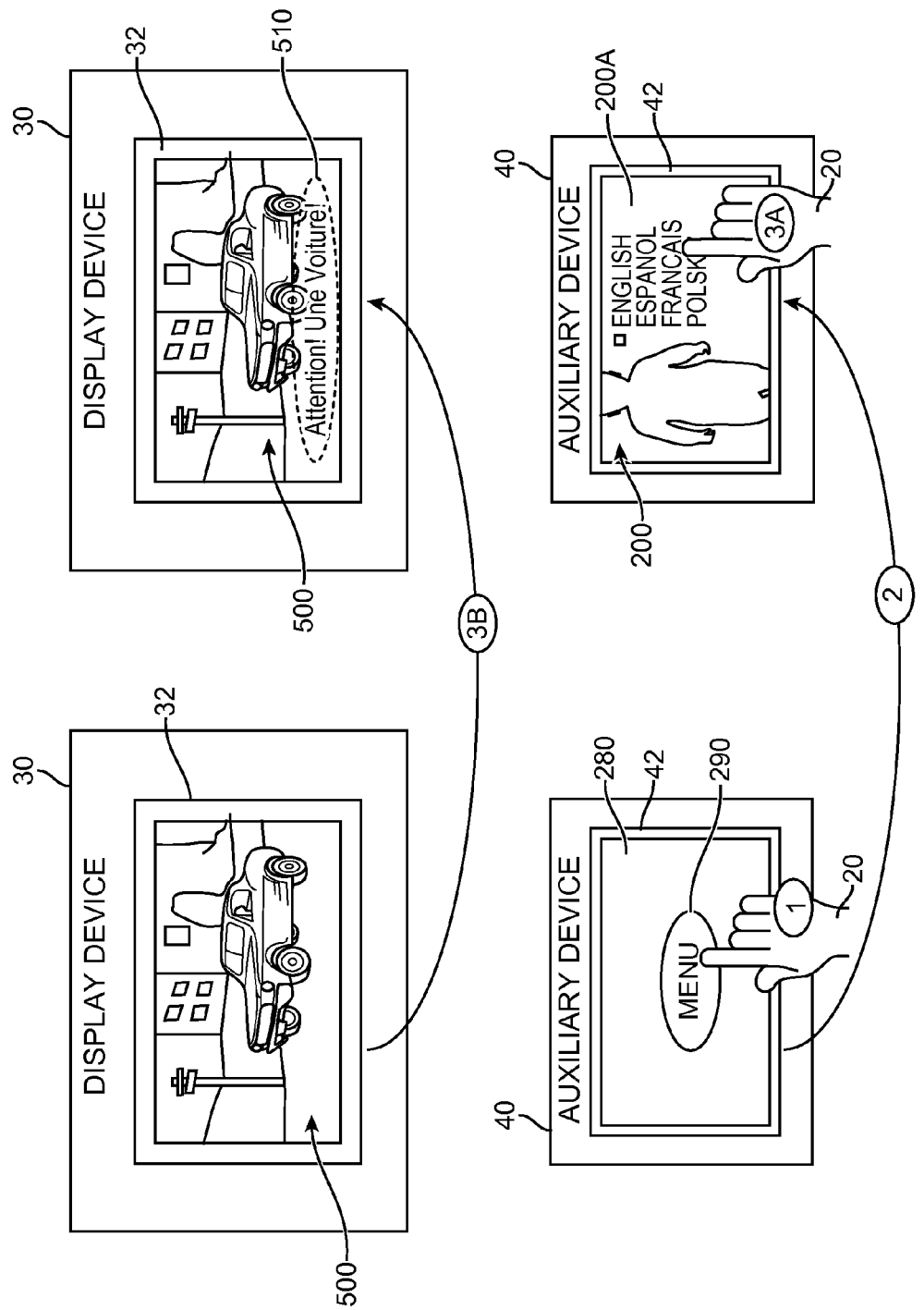
FIG. 5 illustrates playback of content on the display device and controlling the playback of the content using an authored menu displayed on the auxiliary device, in accordance with an embodiment of the invention.

FIG. 5 illustrates playback of content on a display device 30 and controlling the playback of the content using an authored menu 200 displayed on an auxiliary device 40, in accordance with an embodiment of the invention. A menu control app 400 running on an auxiliary device 40 first discovers whether content is playing on a display device 30 within proximity of the auxiliary device 40. If there is content playing on the display device 30, the menu control app 400 then requests menu metadata information associated with the content from a content control unit 300 controlling the playback of the content.

Upon receiving the requested menu metadata information, the menu control app 400 generates and displays a notification page 280 on the auxiliary device 40. The page 280 includes a selectable GUI component 290 (e.g., a link or a button) that notifies a user 20 utilizing the auxiliary device 40 that one or more authored menus 200 associated with the content is available for viewing on the auxiliary device 40. When the user 20 selects the GUI component 290, the menu control app 400 generates an authored menu 200 based on the menu metadata information, and displays the authored menu 200 on the auxiliary device 40.

For example, as shown in FIG. 5, the notification page 280 may include a selectable MENU button 290. When the user 20 selects the MENU button 290, as represented by action bubble 1 in FIG. 5, the menu control app 400 generates an authored menu 200 based on the menu metadata information, and displays the authored menu 200 on the auxiliary device 40. For example, as represented by action bubble 2 in FIG. 5, the menu control app 400 receives and/or generates and displays an authored menu 200A on the auxiliary device 40. The authored menu 200A includes at least one selectable GUI component 203 that is associated with a particular content setting command.

For example, as shown in FIG. 5, the authored menu 200A includes a first selectable link 203 ("ENGLISH") representing a content setting command for displaying English subtitles on the display device 30 during playback of the content, a second selectable link 203 ("ESPAÑOL") representing a content setting command for displaying Spanish subtitles on the display device 30 during playback of the content, a third selectable link 203 ("FRANCAIS") representing a content setting command for displaying French subtitles on the display device 30 during playback of the content, and a fourth selectable link 203 ("POLSKI") representing a content setting command for displaying Polish subtitles on the display device 30 during playback of the content. As shown in FIG. 5, the authored menu 200 may further include formatting information for the menu interface, such as background images, text attributes of the text displayed (such as font type, font size, font color, position), audio for playback during the display of the authored menu 200, etc.

When the user 20 selects the third selectable link 203 ("FRANCAIS"), as represented by action bubble 3A in FIG. 5, the menu control app 400 generates and sends an action message including the selected content setting command (i.e., display French subtitles on the display device 30 during playback of the content) to the content control unit 300. Upon receiving the action message, the content control unit 310 adjusts the playback of the content such that French subtitles 510 are overlaid on top of the content displayed on the display device 30, as represented by action bubble 3B in FIG. 5.

Figure 6:
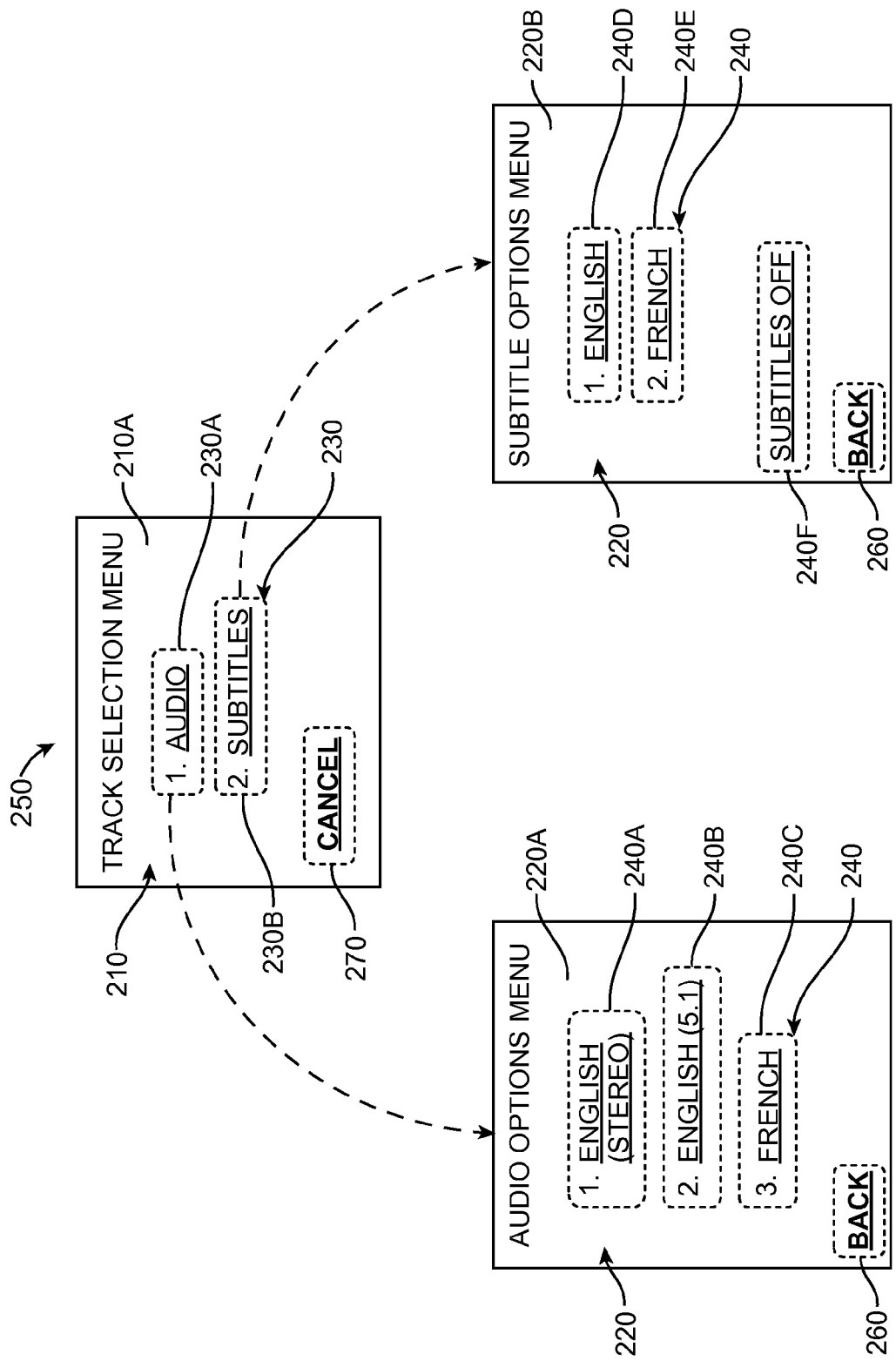
FIG. 6 illustrates an example hierarchy of authored menus, in accordance with an embodiment of the invention.

FIG. 6 illustrates an example menu tree hierarchy 250 for a particular piece of content, in accordance with an embodiment of the invention. In one embodiment, authored menus 200 associated with a particular piece of content may be organized into multiple levels of authored menus 200. For example, the menu tree hierarchy 250 in FIG. 6 comprises a top-level including a top-level (i.e., root) authored menu 210, and at least one sub-level including a sub-level authored menu 220. The menu control app 400 allows a user 20 to navigate through the authored menus 200 displayed on an auxiliary device 40 until an authored menu 200 providing a desired content navigation command and/or content setting command is displayed.

In one embodiment, when the menu control app 400 requests menu metadata information, the menu control app 400 receives menu metadata information associated with a top-level authored menu 210. For example, the menu metadata information received may comprise a URL location for retrieving menu metadata specific to the top-level authored menu 210. The URL location may reside on the display device 30, the content source 50, or elsewhere. The menu control app 400 retrieves menu metadata specific to the top-level authored menu 210 using the URL location, and generates the top-level authored menu 210 for display based on the menu metadata retrieved.

The top-level authored menu 210 may comprise one or more selectable references to one or more sub-level authored menus 220. For example, the top-level authored menu 210 may include one or more selectable components 230 that reference different sub-level authored menus 220. When a user 20 selects a component 230, the menu control app 400 retrieves menu metadata specific to a sub-level authored menu 220 referenced by the selected component 230, and generates the sub-level authored menu 220 for display based on the menu metadata retrieved. In one embodiment, the menu control app 400 retrieves menu metadata specific to the top-level authored menu 210 or a sub-level authored menu 220 using HTTP.

For example, the menu tree hierarchy 250 in FIG. 6 comprises a top-level authored menu 210A titled as "TRACK SELECTION MENU", a first sub-level authored menu 220A titled as "AUDIO OPTIONS MENU", and a second sub-level authored menu 220B titled as "SUBTITLE OPTIONS MENU". The example top-level authored menu 210A comprises a first selectable component 230A ("AUDIO") that references the first sub-level authored menu 220A, and a second selectable component 230B ("SUBTITLES") that references the second sub-level authored menu 220B. The top-level authored menu 210A further includes a selectable component 270 ("CANCEL") that triggers, when selected, the menu control app 400 to turn off the display of authored menus 200 on the auxiliary device 40.

If the user 20 selects the first selectable component 230A, the menu control app 400 generates and displays the first sub-level authored menu 220A on the auxiliary device 40. If the user 20 selects the second selectable component 230B instead, the menu control app 400 generates and displays the second sub-level authored menu 220B on the auxiliary device 40.

Each authored menu 200 may comprise one or more selectable components 240 associated with a particular content navigation command and/or a content setting command. For example, as shown in FIG. 6, the first sub-level authored menu 220A comprises a first selectable component 240A ("ENGLISH (STEREO)") representing a content setting command for setting audio playback to English in stereo mode, a second selectable component 240B ("ENGLISH (5.1)") representing a content setting command for setting audio playback to English in 5.1 surround mode, and a third selectable component 240C ("FRENCH") representing a content setting command for setting audio playback to French. The second sub-level authored menu 220B comprises a first selectable component 240D ("ENGLISH") representing a content setting command for setting subtitles displayed to English, a second selectable component 240E ("FRENCH") representing a content setting command for setting subtitles displayed to French, and a third selectable component 240F ("SUBTITLES OFF") for turning off the display of subtitles.

Each sub-level authored menu 220 may further comprise a selectable component 260 for returning to an authored menu 200 preceding the sub-level authored menu 220 (e.g., the top-level menu 210A).

Figure 7:
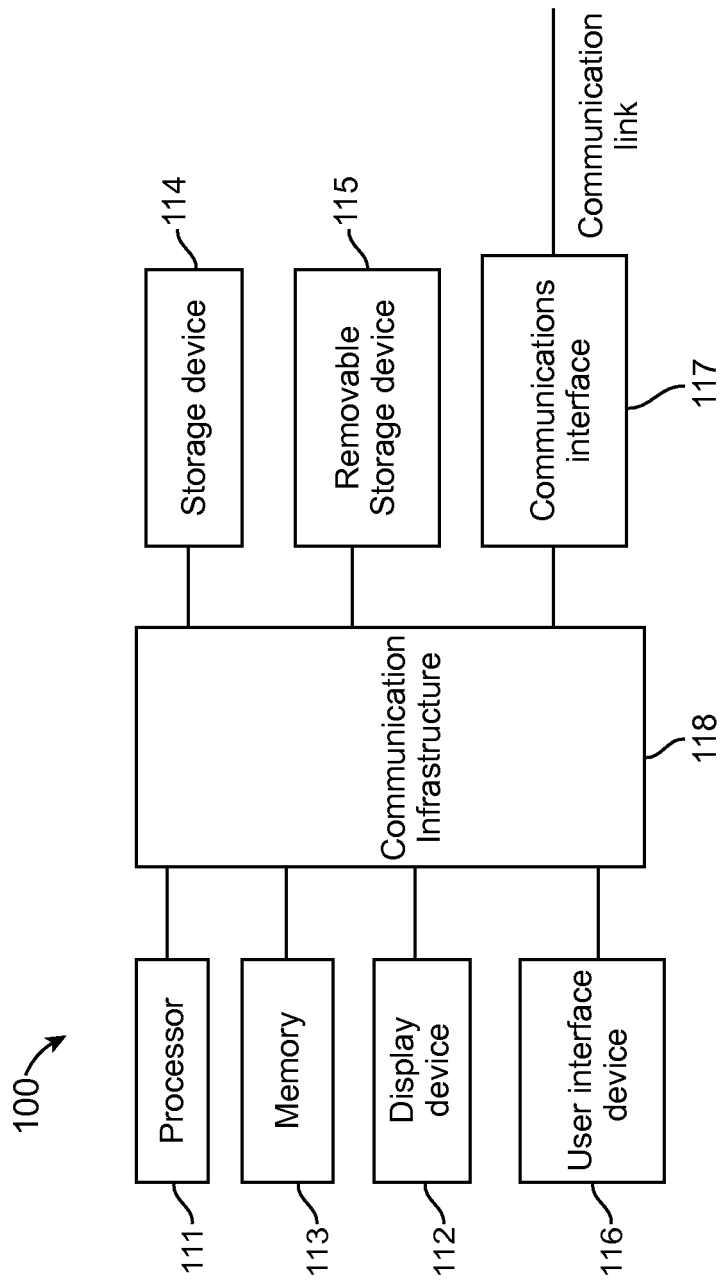
FIG. 7 is a high level block diagram showing an information processing system comprising a computer system useful for implementing an embodiment of the present invention.

FIG. 7 is a high level block diagram showing an information processing system comprising a computer system 100 useful for implementing an embodiment of the present invention. The computer system 100 includes one or more processors 111, and can further include an electronic display device 112 (for displaying graphics, text, and other data), a main memory 113 (e.g., random access memory (RAM)), storage device 114 (e.g., hard disk drive), removable storage device 115 (e.g., removable storage drive, removable memory module, a magnetic tape drive, optical disk drive, computer readable medium having stored therein computer software and/or data), user interface device 116 (e.g., keyboard, touch screen, keypad, pointing device), and a communication interface 117 (e.g., modem, a network interface (such as an Ethernet card), a communications port, or a PCMCIA slot and card). The communication interface 117 allows software and data to be transferred between the computer system and external devices. The system 100 further includes a communications infrastructure 118 (e.g., a communications bus, network) to which the aforementioned devices/modules 111 through 117 are connected.

Information transferred via communications interface 117 may be in the form of signals such as electronic, electromagnetic, optical, or other signals capable of being received by communications interface 117, via a communication link that carries signals and may be implemented using wire or cable, fiber optics, a phone line, a cellular phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

What is claimed is:

1. A system, comprising:
   at least one processor; and
   a non-transitory processor-readable memory device storing instructions that when executed by the at least one processor causes the at least one processor to perform operations including:
      discovering a first device controlling playback of a piece of content currently displayed on a display;
      requesting menu metadata information associated with the piece of content from the first device;
      providing a menu interface authored for the piece of content based on the menu metadata information, wherein the menu interface is formatted based on the menu metadata information; and
      enabling interaction with the menu interface during the playback of the piece of content;
   wherein the menu interface and the piece of content are displayed on different devices, and the menu interface is displayed without interrupting the playback of the piece of content.

2. The system of claim 1, wherein the operations further comprise:
   displaying the menu interface on a second device, wherein the menu interface is displayed in a menu format compatible with one or more device attributes of the second device;
   wherein the piece of content is displayed on a display device including the display; and
   wherein the first device resides on one of the following: the display device, or a content source providing the piece of content to the display device.

3. The system of claim 1, wherein:
   the menu interface comprises a selectable graphical user interface (GUI) component; and
   the selectable GUI component is associated with a content playback setting.

4. The system of claim 3, wherein the operations further comprise:

generating an action message in response to a selection of the selectable GUI component during interaction with the menu interface, wherein the action message comprises information identifying the content playback setting; and transmitting the action message to one of the first device or a content source providing the piece of content to the display, wherein the playback of the piece of content is adjusted based on the content playback setting.

5. The system of claim 4, wherein:
a content playback parameter associated with the content playback setting is updated.

6. The system of claim 4, wherein:
the content playback setting represents one of the following: an audio track selection, a video track selection, an audio selection, and a subtitle selection.

7. The system of claim 1, wherein:
at least one of a font type, font size, font color, screen positioning information, and a background image of the menu interface is formatted based on the menu metadata information.

8. The system of claim 1, wherein:
the menu interface comprises a top-level menu interface;
the top-level menu interface comprises a selectable GUI component; and
the selectable GUI component is associated with another menu interface authored for the piece of content based on the menu metadata information.

9. A method, comprising:
discovering a first device controlling playback of a piece of content currently displayed on a display;
requesting menu metadata information associated with the piece of content from the first device;
generating a menu interface authored for the piece of content based on the menu metadata information, wherein the menu interface is formatted based on the menu metadata information; and
enabling interaction with the menu interface during the playback of the piece of content;
wherein the menu interface and the piece of content are displayed on different devices, and the menu interface is displayed without interrupting the playback of the piece of content.

10. The method of claim 9, further comprising:
displaying the menu interface on a second device, wherein the menu interface is displayed in a menu format compatible with one or more device attributes of the second device;
wherein the piece of content is displayed on a display device including the display; and
wherein the first device resides on one of the following: the display device, or a content source providing the piece of content to the display device.

11. The method of claim 9, wherein:
the menu interface comprises a selectable graphical user interface (GUI) component; and
the selectable GUI component is associated with a content playback setting.

12. The method of claim 11, further comprising:
generating an action message in response to a selection of the selectable GUI component during interaction with the menu interface, wherein the action message comprises information identifying the content playback setting; and
transmitting the action message to one of the first device or a content source providing the piece of content to the display, wherein the playback of the piece of content is adjusted based on the content playback setting.

13. The method of claim 12, wherein:
the content playback setting represents one of the following: an audio track selection, a video track selection, an audio selection, and a subtitle selection.

14. The method of claim 9, wherein:
at least one of a font type, font size, font color, screen positioning information, and a background image of the menu interface is formatted based on the menu metadata information.

15. The method of claim 9, wherein:
the menu interface comprises a top-level menu interface;
the top-level menu interface comprises a selectable GUI component; and
the selectable GUI component is associated with another menu interface authored for the piece of content based on the menu metadata information.

16. A non-transitory computer-readable medium having instructions which when executed on a computer perform a method comprising:
discovering a first device controlling playback of a piece of content currently displayed on a display;
requesting menu metadata information associated with the piece of content from the first device;
generating a menu interface authored for the piece of content based on the menu metadata information, wherein the menu interface is formatted based on the menu metadata information; and
enabling interaction with the menu interface during the playback of the piece of content;
wherein the menu interface and the piece of content are displayed on different devices, and the menu interface is displayed without interrupting the playback of the piece of content.

17. The medium of claim 16, the method further comprising:
displaying the menu interface on a second device, wherein the menu interface is displayed in a menu format compatible with one or more device attributes of the second device;
wherein the piece of content is displayed on a display device including the display; and
wherein the first device resides on one of the following: the display device, or a content source providing the piece of content to the display device.

18. The medium of claim 16, wherein:
the menu interface comprises a selectable graphical user interface (GUI) component; and
the selectable GUI component is associated with a content playback setting.

19. The medium of claim 18, the method further comprising:
generating an action message in response to a selection of the selectable GUI component during interaction with the menu interface, wherein the action message comprises information identifying the content playback setting; and
transmitting the action message to one of the first device or a content source providing the piece of content to the display, wherein the playback of the piece of content is adjusted based on the content playback setting.

20. The medium of claim 19, wherein:
the content playback setting represents one of the following: an audio track selection, a video track selection, an audio selection, and a subtitle selection.

* * * * *